US006553899B1

United States Patent
Kao

(10) Patent No.: US 6,553,899 B1
(45) Date of Patent: Apr. 29, 2003

(54) JUICER WITH AN EASY-TO-ASSEMBLE PIVOTAL CONNECTION FOR THE HANDLE

(76) Inventor: I-Feng Kao, No. 6, Shin-Ho 2nd Road, An-Pyng Industrial Zone, Tainan (TW)

(*) Notice: Subject to any disclaimer, the term of this patent is extended or adjusted under 35 U.S.C. 154(b) by 0 days.

(21) Appl. No.: 10/247,501

(22) Filed: Sep. 19, 2002

(51) Int. Cl.[7] .............................. A23L 1/00; A23N 1/00; A47J 19/02
(52) U.S. Cl. .............................. 99/507; 99/506; 99/508
(58) Field of Search .......................... 99/495, 501–508, 99/595; 100/125, 98 R, 213, 283, 110, 131–135; 210/307, 514; D7/665, 666

(56) References Cited

U.S. PATENT DOCUMENTS

| | | | | |
|---|---|---|---|---|
| 1,115,754 A | * | 11/1914 | Walker | 99/507 |
| 2,018,932 A | * | 10/1935 | Thorne | 99/508 X |
| 2,042,341 A | * | 5/1936 | Ilgenfritz | 99/506 X |
| 2,099,170 A | * | 11/1937 | Majewski, Jr. | 99/495 X |
| 2,160,523 A | * | 5/1939 | Scurlock | 99/507 |
| 2,238,571 A | * | 4/1941 | Scott | 99/508 X |
| 2,497,335 A | * | 2/1950 | Wissner | 99/495 X |
| 2,674,182 A | * | 4/1954 | Kirkpatrick | 100/98 R |
| 2,786,502 A | * | 4/1957 | Turner | 100/288 X |
| 4,530,277 A | * | 7/1985 | Matsumoto | 100/131 X |
| 5,084,177 A | * | 1/1992 | Keene | 210/514 |
| 5,510,028 A | * | 4/1996 | Kuhlman | 210/307 |
| 5,520,105 A | * | 5/1996 | Healy | 100/98 R |

* cited by examiner

*Primary Examiner*—Timothy F. Simone
(74) *Attorney, Agent, or Firm*—Alan Kamrath; Rider, Bennett, Egan & Arundel, LLP

(57) ABSTRACT

A juicer comprises a base, a column extending upright from the base, a head securely attached to an upper end of the column, a vertical rod extending vertically through the head, a Y-shaped handle including a main section and two arms branching from an end of the main section, and a pair of connecting rods. A pressure cup is securely attached to a lower end of the vertical rod by a connecting member. The distal ends of the arms of the handle are connected to the head by an axle without threading connection. The lower ends of the connecting rods are pivotally connected to two ears on two ends of the connecting member without threading connection.

4 Claims, 5 Drawing Sheets

JUICER WITH AN EASY-TO-ASSEMBLE PIVOTAL CONNECTION FOR THE HANDLE

BACKGROUND OF THE INVENTION

1. Field of the Invention

The present invention relates to a juicer with an easy-to-assemble pivotal connection for the handle of the juicer, providing a simple structure and allowing easy assembly of the juicer.

2. Description of the Related Art

FIGS. 1 and 2 of the drawings illustrate a conventional juicer of the type having a Y-shaped handle 15 for saving force when pressing fruit. The juicer comprises a base 11, a column 12 extending upright from a side of the base 11, a head 13 securely attached to an upper end of the column 12, a vertical rod 14 extending vertically through the head 13, and a Y-shaped handle 15 for effecting vertical movement of the vertical rod 14. A detachable pressure cup 142 is attached to a connecting member 141 mounted to a lower end of the vertical rod 14. A bracket 16 is attached to an intermediate portion of the column 12 for receiving fruit to be pressed by the pressure cup 142.

The head 13 includes a pivotal section 132 having a transverse hole 131 in which a sleeve 133 is mounted, the sleeve 133 having an inner threading. The connecting member 141 of the pressure cup 142 includes a screw hole 143. The Y-shaped handle 15 includes a main section 151 and two arms 152 branching off from an end of the main section 151. A bolt 2 is extended through the sleeve 133 that extends through the distal ends of the arms 152 such that the handle 15 may pivot about a longitudinal axis of the bolt 2. An intermediate portion of each arm 152 is connected by a bolt 2a to an end of a connecting rod 17, and the other end of the connecting rod 17 is connected by another bolt 2b to the connecting member 141. Thus, the vertical rod 14 is moved vertically upon pivotal movement of the handle 15.

Although the juicer provides a force-saving effect while pressing fruit, the assembling procedure for the handle 15, the head 13, and the connecting rods 17 and the assembling procedure for the pressing cup 14 and the connecting rods 17 are troublesome, as bolts 2, 2a, and 2b are used. Further, a sleeve 13 with an inner threading is required for threading engagement with the bolt 2, and it is necessary to form a screw hole in each end of each connecting rod 17 for engagement with the bolts 2a and 2b. Additional processing and assembling are required. Further, the bolts 2, 2a, and 2b may be disengaged from the juicer due to repeated operations of the handle 15.

SUMMARY OF THE INVENTION

An object of the present invention is to provide a juicer with an easy-to-assemble pivotal connection for the handle of the juicer, providing a simple structure and allowing easy assembly of the juicer.

A juicer in accordance with the present invention comprises:

- a base;
- a column extending upright from the base;
- a head securely attached to an upper end of the column, the head including a vertical hole and a transverse hole;
- a vertical rod extending vertically through the vertical hole of the head, a pressure cup being securely attached to a lower end of the vertical rod by a connecting member;
- a Y-shaped handle including a main section and two arms branching from an end of the main section, each arm including a distal end having a hole aligned with the transverse hole of the head; and
- a pair of connecting rods each having an upper end and a lower end aligned with the connecting member, the upper end of each connecting rod being connected to an intermediate portion of an associated one of the arms of the handle;
- an axle pivotally extended through the transverse hole of the head and the holes of the handle, each of two ends of the axle including an annular groove, a first retainer being mounted in each said annular groove of the axle for preventing disengagement of the axle;
- the connecting member of the pressure cup including two ears respectively extending outward from two ends thereof, each said ear including an annular groove, each said ear respectively extending through the lower end of an associated one of the connecting rods, a second retainer being mounted in said annular groove of each said ear for preventing disengagement of the connecting rod; and
- a pin extended through the upper end of each said connecting rod and intermediate portion of each said arm of said handle, and a third retainer being provided for preventing disengagement of said handle.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
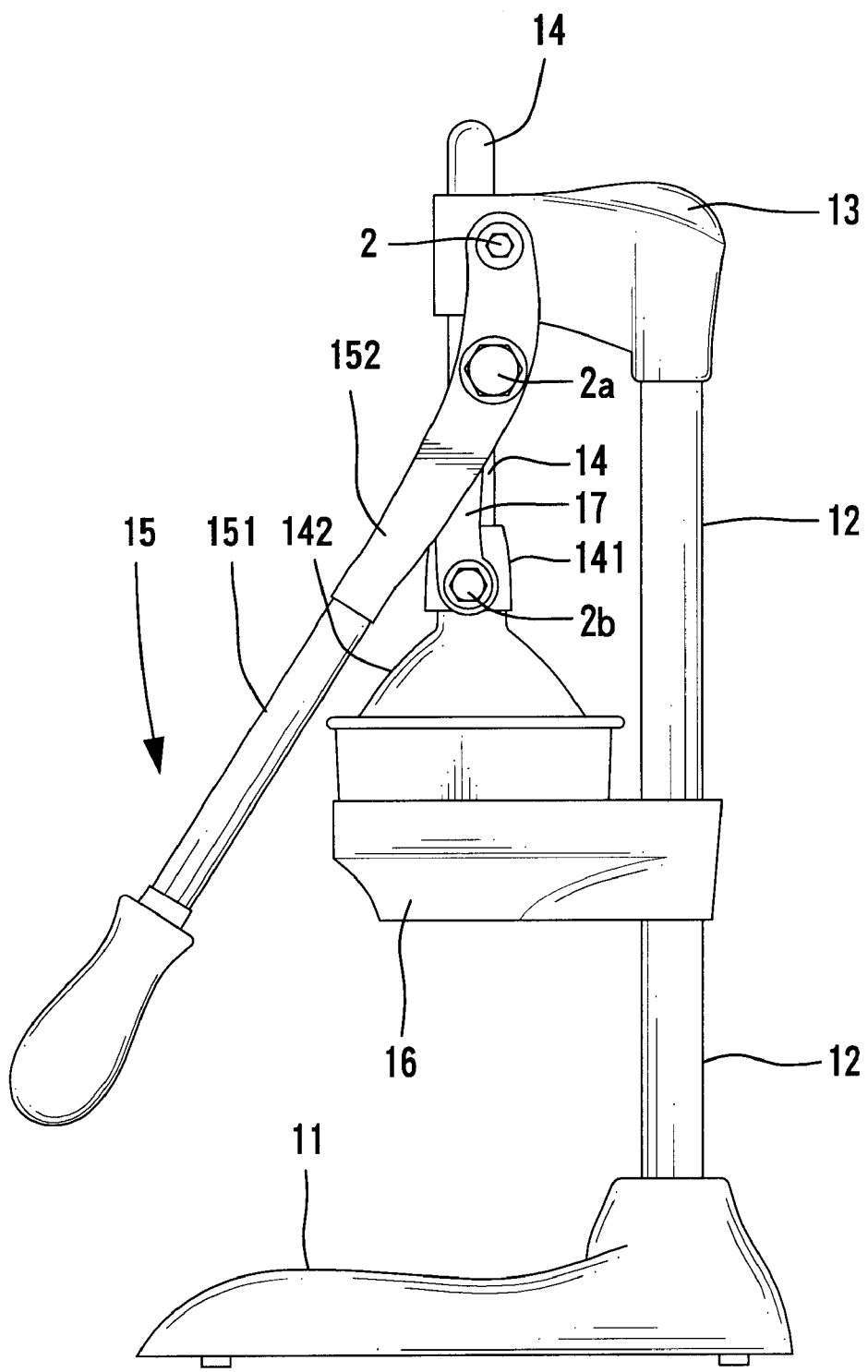
FIG. 1 is a side view of a conventional juicer having a Y-shaped handle.
Figure 2:
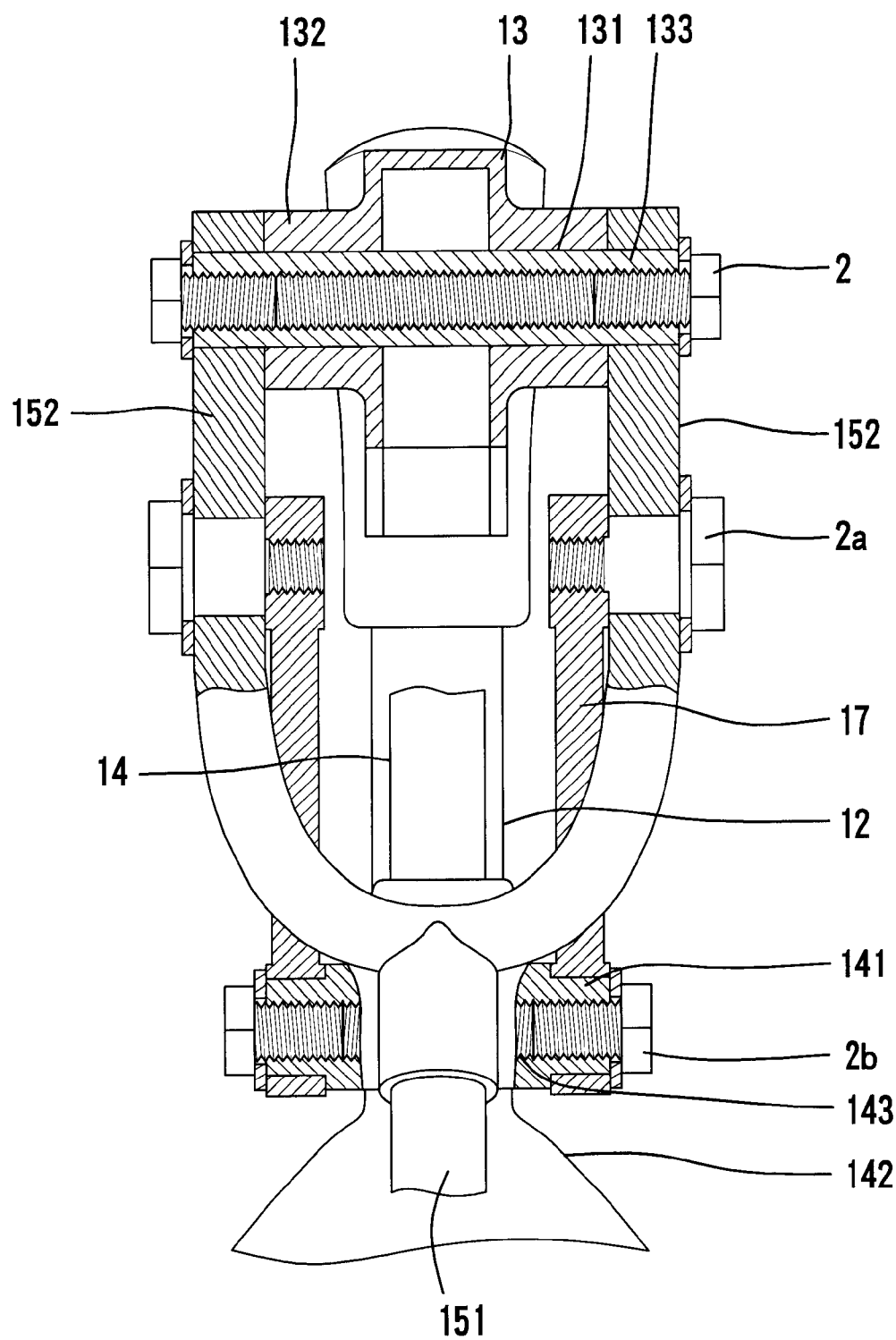
FIG. 2 is an enlarged sectional view of the conventional juicer in FIG. 1.
Figure 3:
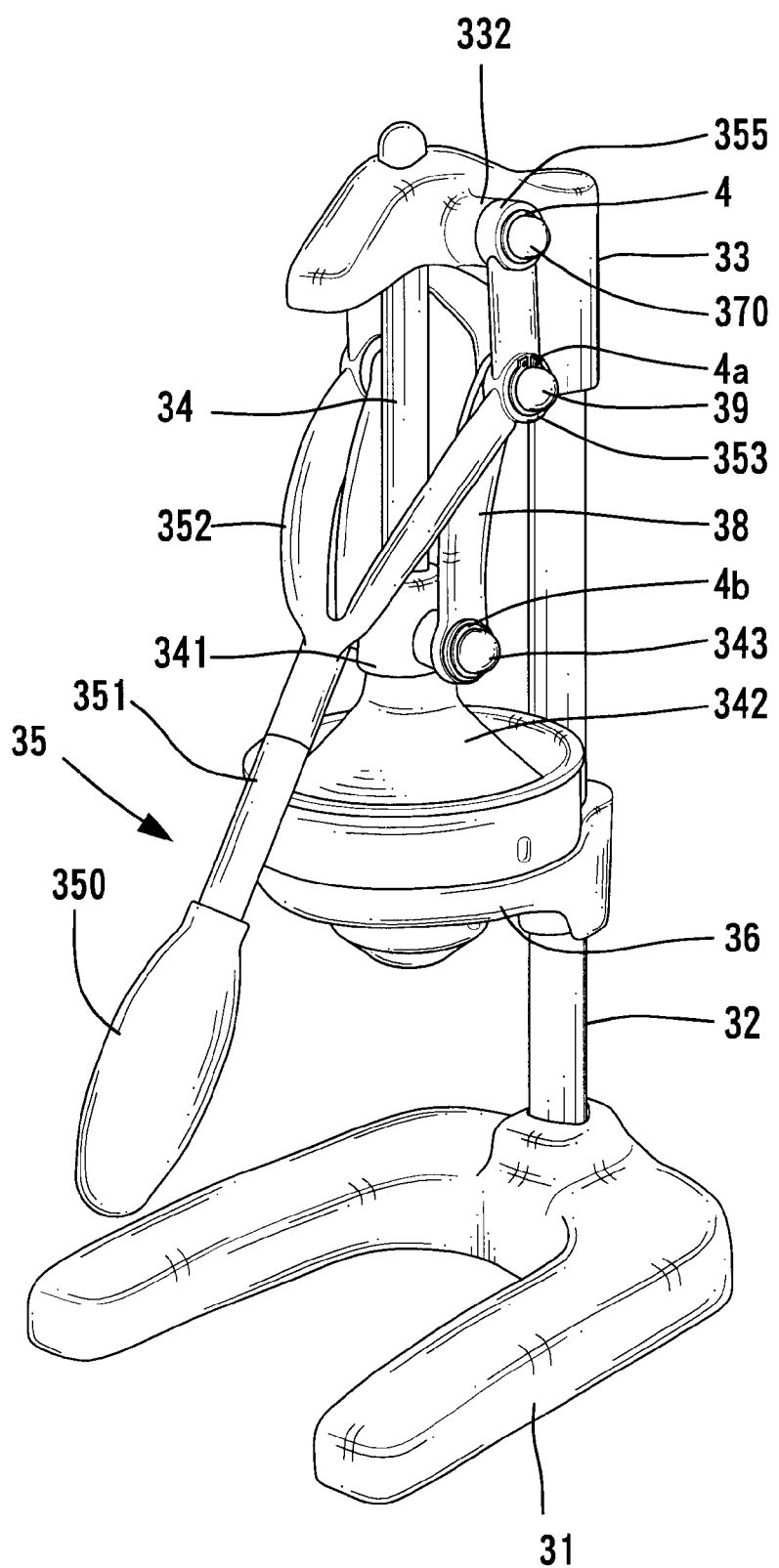
FIG. 3 is a perspective view of a juicer in accordance with the present invention.
Figure 4:
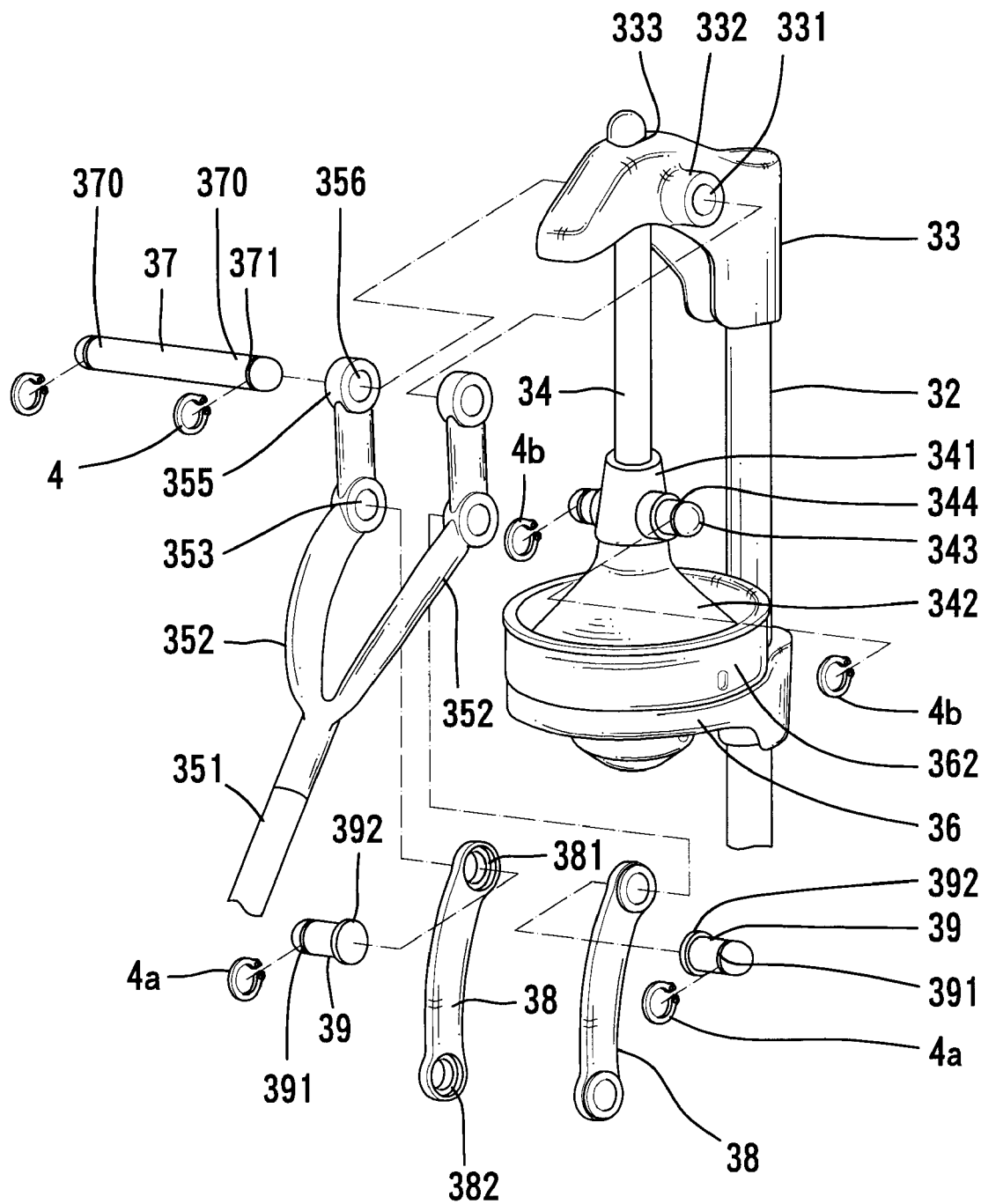
FIG. 4 is an exploded perspective view of a portion of the juicer in accordance with the present invention.
Figure 5:
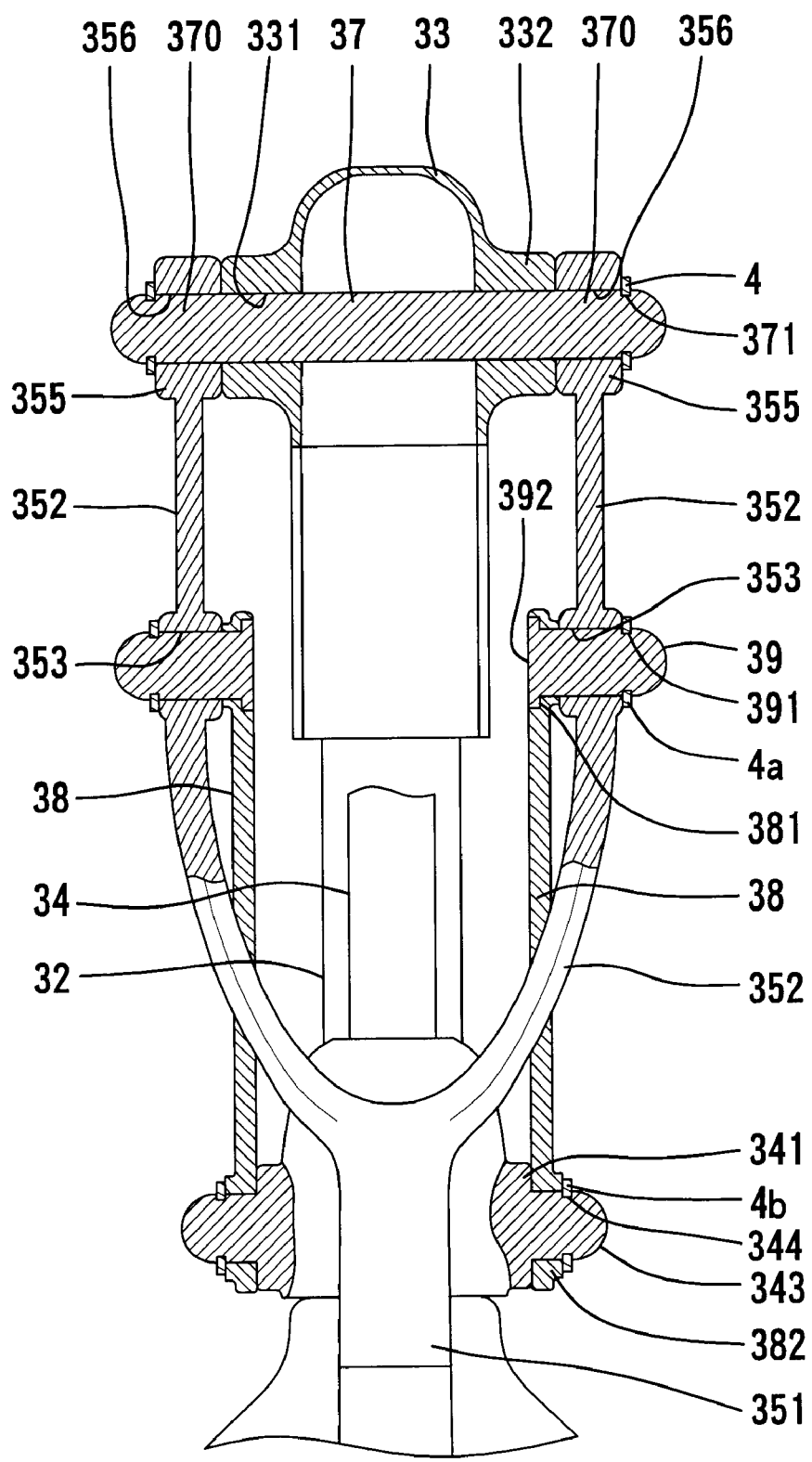
FIG. 5 is an enlarged sectional view of a main portion of the juicer in accordance with the present invention.

Referring to FIGS. 3 through 5, a juicer in accordance with the present invention generally comprises a base 31, a column 32 extending upright from a side of the base 31, a head 33 securely attached to an upper end of the column 32, a vertical rod 34 extending vertically through the head 33, and a Y-shaped handle 35 for effecting vertical movement of the vertical rod 34. A detachable pressure cup 342 is attached to a connecting member 341 mounted to a lower end of the vertical rod 34. A bracket 36 is attached to an intermediate portion of the column 32 for receiving fruit to be pressed by the pressure cup 342.

The head 33 includes a pivotal section 332 having a transverse hole 331 in which an axle 37 is mounted. The axle 37 includes an annular groove 371 in each of two ends 370 thereof. The axle 37 is pivotally received in the transverse hole 331 of the head 33. A retainer 4 (such as a C-clip) is partially received in each annular groove 371 of the axle 37, thereby preventing disengagement of the axle 37. The head 33 further includes a vertical hole 333 through which an upper end of the vertical rod 34 extends.

The connecting member 341 of the pressure cup 342 includes an ear 343 extending outward from each of two ends thereof. Each ear 343 is substantially cylindrical and includes an annular groove 344.

The Y-shaped handle 35 includes a main section 351 and two arms 352 branching off from an end of the main section 351. A grip 350 is formed on the other end of the handle 35. Each arm 352 has a ring 355 formed on a distal end thereof. A hole 355 is defined in an intermediate portion of each arm 352. The rings 355 are located outside the pivotal section 332 of the head 33, with the holes 356 of the rings 355 being aligned with the transverse hole 331 of the pivotal section 332. Two connecting rods 38 are provided for connecting the connecting member 341 and the handle 35. Each connecting rod 38 has an upper end 381 having a hole (not labeled) aligned with the hole 353 of the respective arm 352 handle 35. Each connecting rod 38 includes a lower end 382 having a hole (not labeled) so as to be mounted around the respective ear 343 of the connecting member 341.

In assembly, the axle 37 is extended through the rings 355 of the handle 35 and the transverse hole 331 of the pivotal section 332 of the head 33 such that the handle 35 may pivot about a longitudinal axis of the axle 37. A pin 39 is extended through the hole 353 of each arm 35 of the handle 35 and the upper end 381 of the associated connecting rod 38, and a retainer 4a (such as a C-clip) is partially received in an annular groove 391 in the pin 39 to prevent disengagement of the handle 35. The pin 39 includes an enlarged end 392 o prevent disengagement from the upper end 381 of the connecting rod 38. A further retainer 4b is mounted in the annular groove 344 in each ear 343 of the connecting member 341 to thereby prevent disengagement of the connecting rod 38.

Referring to FIGS. 4 and 5, the pivotal connection between the handle 35 and the head 33 is provided by means of extending two ends 370 of the axle 37 through the rings 355 of the arms 352 of the handle 35 and then retaining the rings 355 of the arms 352 in place by snapping retainers 4 into the annular grooves 371 of the axle 37. Further, the pivotal connection between the handle 35 and the connecting rods 38 is provided by means of extending pins 39 through the upper ends 381 of the connecting rods 38 and the holes 353 of the arms 352 and then retaining the arms 352 of the handle 35 in place by snapping retainers 4a into the annular grooves 391 of the pins 39. Further, the pivotal connection between pressure cup 34 and the connecting rods 38 is provided by means of extending the ears 343 of the connecting member 341 through the lower ends 382 of the connecting rods 38 and then retaining the lower ends 382 of the connecting rods 38 in place by snapping retainers 4b into the annular grooves 344 of the ears 343 of the connecting member 341.

Thus, the vertical rod 14 is moved vertically upon pivotal movement of the handle 15 for effecting pressing of fruit received in the bracket 36.

The retainers 4, 4a, and 4b allow pivotal connection of the axle 37, the ears 343 of the connecting member 341, and the pins 39 while preventing disengagement of the axle 37, the ears 343 of the connecting member 341, and the pins 39, as the retainers 4, 4a, and 4b are respectively, partially received in the annular grooves 371 of the axle 37, the annular grooves 391 of the pins 39, and the annular groove 344 of the ears 343. The drawbacks in the conventional design are eliminated, including the need of a sleeve 133 having a screw hole, formation of a screw hole in the connecting member 141 and in each end of the connecting rod 17, and troublesome assembling procedure as well as the increased cost for manufacture and assembly.

Although the invention has been explained in relation to its preferred embodiment, it is to be understood that many other possible modifications and variations can be made without departing from the scope of the invention as hereinafter claimed.

What is claimed is:

1. A juicer comprising:

a base;

a column extending upright from the base;

a head securely attached to an upper end of the column, the head including a vertical hole and a transverse hole;

a vertical rod extending vertically through the vertical hole of the head, a pressure cup being securely attached to a lower end of the vertical rod by a connecting member;

a Y-shaped handle including a main section and two arms branching from an end of the main section, each said arm including a distal end having a hole aligned with the transverse hole of the head;

pair of connecting rods each having an upper end and a lower end aligned with the connecting member, said upper end of each said connecting rod being connected to an intermediate portion of an associated one of said arms of said handle;

an axle pivotally extended through the transverse hole of the head and the holes of the handle, each of two ends of the axle including an annular groove, a first retainer being mounted in each said annular groove of the axle for preventing disengagement of the axle;

the connecting member of the pressure cup including two ears respectively extending outward from two ends thereof, each said ear including an annular groove, each said ear respectively extending through the lower end of an associated one of the connecting rods, a second retainer being mounted in said annular groove of each said ear for preventing disengagement of the connecting rod; and a pin extended through the upper end of each said connecting rod and intermediate portion of each said arm of said handle, and a third retainer being provided for preventing disengagement of said handle.

2. The juicer as claimed in claim 1, wherein each said pin includes an annular groove for receiving said third retainer.

3. The juicer as claimed in claim 1, wherein each said ear is substantially cylindrical.

4. The juicer as claimed in claim 1, wherein said intermediate portion of each said arm includes a hole through which an associated one of the pins extends.

* * * * *